No. 815,430. PATENTED MAR. 20, 1906.
T. B. JEFFERY.
PNEUMATIC TIRED WHEEL.
APPLICATION FILED NOV. 21, 1904.
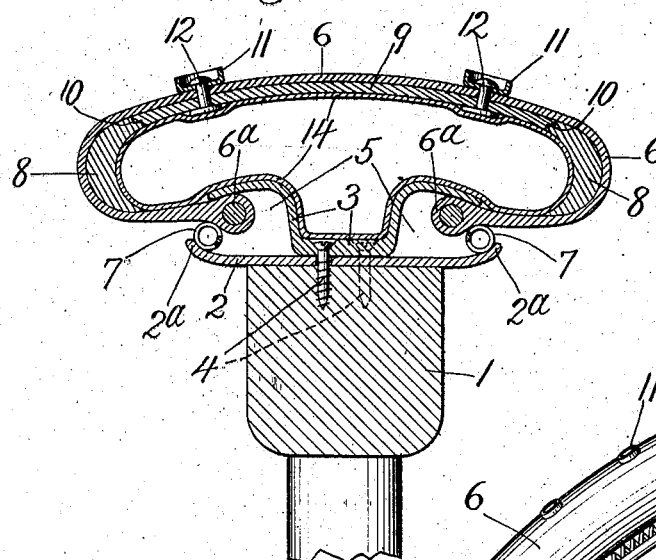
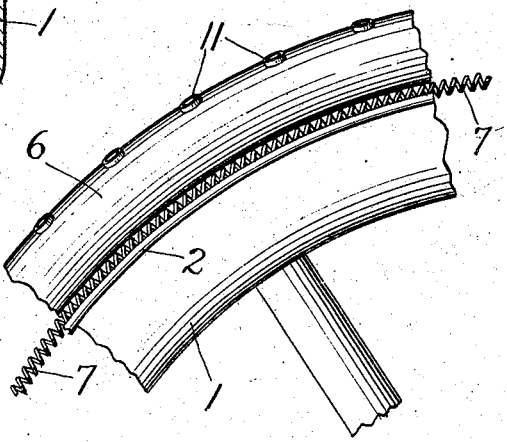
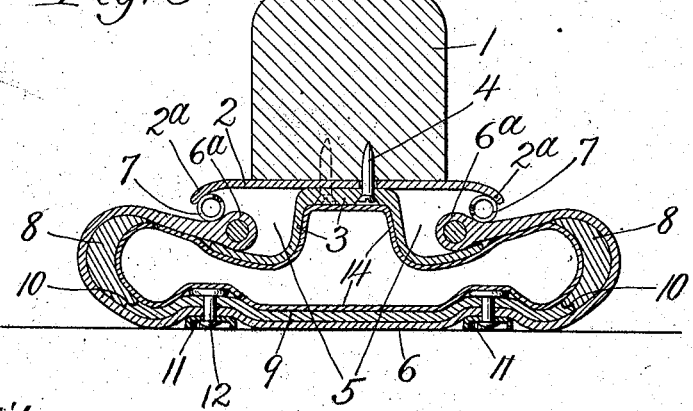
Witnesses
Edward T. Wray.
Fred G. Fischer
Inventor.
Thomas B. Jeffery
by Burton & Burton
his Attys.

UNITED STATES PATENT OFFICE.

THOMAS B. JEFFERY, OF KENOSHA, WISCONSIN.

PNEUMATIC-TIRED WHEEL.

No. 815,430.    Specification of Letters Patent.    Patented March 20, 1906.

Application filed November 21, 1904. Serial No. 233,698.

*To all whom it may concern:*

Be it known that I, THOMAS B. JEFFERY, a citizen of the United States, residing at Kenosha, in the county of Kenosha and State of Wisconsin, have invented new and useful Improvements in Pneumatic-Tired Wheels, of which the following is a specification, reference being had to the accompanying drawings, forming a part thereof.

The purpose of this invention is to provide an improved construction of pneumatic-tired wheel with the specific purposes, first, of broadening the tread of such wheel upon the pavement and giving it more secure grip thereon; second, providing such tire-casing with means for guarding against puncture of the same or of an interior tube with which it may be fitted; third, preventing the tire from being folded abruptly so as to be cut or worn over the edge of the retaining rim or rims of the felly either in inflation or in the compression caused by the load; and fourth, adapting the tire-casing to be held and providing improved means for holding the same at its lateral margins in or to the rim of the felly in a manner permitting its ready attachment and detachment when deflated without causing insecurity or liability to disengagement when inflated.

It consists of the features of construction set out in the claims.

In the drawings, Figure 1 is a transverse section, radial with respect to the wheel, of a portion of the felly and rim and tire of the wheel embodying my present invention, showing the same fully inflated. Fig. 2 is a detail side elevation of a portion of such wheel. Fig. 3 is a similar section showing the tire inflated, but compressed, as when the wheel is carrying a load.

I have shown this improved tire secured to a wheel having a wood felly 1 and having encompassing such wood felly circumferential with respect to the wheel a metal rim consisting, preferably, of two elements, with an inner element 2, which is dished or exteriorly hollowed in cross-section, such form being preferably produced merely by upturning or outwardly flaring the lateral margins where they overhang or may overhang the felly at opposite sides, and an outer element 3, which encompasses the inner element, both elements being secured together and to the felly by bolts or screws 4 4 4 4, binding the elements together and taking into the felly for securing them to the latter at a belt or zone encompassing the wheel substantially midway in the width of the felly and said tire elements. The outer element 3 is flared or expanded at its lateral margins away from the inner element to form between the two at each side a recess or cavity 5, the mouth or lateral opening of which is narrower than its dimensions back of such mouth. This narrowing is preferably caused mainly by the outward flaring of the lateral margins of the inner element 2, causing it to be exteriorly dished, as stated; but the lateral margins of the outer element 3 may also trend somewhat inward toward the axis of the wheel for narrowing the mouth in comparison with the inner portion of the recess. The tire-casing 6, designed to be secured to the laterally-recessed two-part rim described, has its lateral margins reinforced or thickened, as shown at 6ª, said reinforce or thickened portions being adapted to enter the narrowed mouths of the recesses 5 5, respectively. For retaining the margins of the tires in the recesses I provide the annular retainers 7 7, which encompass the wheel, being lodged in the seats afforded for them by the upturned or flared margins 2ª of the inner element 2 of the tire, said retainers being of such size or thickness that while they can be entered through the narrowed mouths of the recesses 5 after the tire-casing has been entered therein and pushed back therein as far as the recess will permit they will not permit the withdrawal of the enlarged and reinforced edges 6ª of the casing through said mouths—that is, the sum of the thickness of the enlarged or reinforced portion 6ª and of the retainer 7 is considerably more than the width of the mouth—so that any stress applied to the tire-casing tending to withdraw its edge from the recess will not avail, because the enlargement 6ª, becoming engaged inward of the retainer 3, will draw the latter toward the mouth at the same time the enlarged edge is drawn theretoward, and since the two cannot escape together neither can escape through the mouth insufficient for both. A preferred form of construction for the retainer is shown in the drawings, in which it is represented as made of comparatively fine wire coiled in a spiral, the spiral being wrapped about the rim in the seat formed by the upturned or flattened margin 2ª, the two ends of the spiral being preferably joined up so as to make an endless retainer, which in that event may be readily stretched on account of the spiral contraction to pass over the outwardly-flared edge of the element 2, so that it may lodge back of that edge in the seat described, to which it will contract and in which it will be held snugly by such contraction, blockading the mouth against the exit of the enlarged and reinforced margin 6ª of the casing.

A tire inflated to circular cross-section, as is customary, and alternately subjected to and relieved from flattening at the tread caused by the weight of the load is exposed to an amount of back-and-forth bending at the sides which rapidly deteriorates it there, causing rupture at the sides even sooner than at the tread, although the latter is exposed to much greater frictional wear. To reduce this back-and-forth bending to a negligible amount, I aim to prevent the tire from becoming circular under inflation and to cause that even at the maximum inflation it shall be transversely oblong or flattened, as seen in Fig. 1. For that purpose I provide reinforces 8 8 within the casing at opposite sides, such reinforces being of comparatively flexible rubber, which is molded so as to be substantially or approximately crescent-shaped in cross-section, as seen in Fig. 1, the outer curve of the crescent form being conformed to the dimensions and shape of the tire when inflated to the degree or extent to which it is designed to be inflated for use and at which its inflation is designed to be limited. These reinforces being cemented firmly to the casing 6, they practically determine its form under inflation unless such inflation proceeds to a degree or tension tending to tear the casing from the reinforce; but to prevent such rupture or separation and for another purpose hereinafter stated I prefer to connect the two reinforces from side to side of the tire by a tread-reinforce 9, which is preferably of leather, extending entirely around the wheel at the inner side of the casing and having its lateral margins suitably held into or interlocked with the corresponding abutting margins of the reinforces 8 8 and cemented thereto, respectively, at such interlocked margins as appearing at 10 10 in Fig. 1. This reinforce 9 is also preferably cemented or otherwise permanently secured to the tire-casing, and when made of leather and comparatively stiff it very materially tends to prevent the distention of the tire beyond the flattened form shown in the drawings. The reinforce 10, beside stiffening the tire-casing so as to assist in supporting the sides and preventing its inflation to a circular form in cross-section, has the further purpose and use of preventing puncture of the casing or of an interior tube 14, which may be employed within it for inflation. Partly as a means of securing the reinforce 9 to the tire-casing, but more particularly for the purpose of giving the tire a firmer grip than it would otherwise have upon the pavement, especially when the latter is wet and slippery, I provide the outwardly concave or cupped traction-disks 11 11, which are riveted onto the outer surface of the casing, the rivets 12 taking through both the casing and the leather reinforce 9, and so constituting means of securing the latter to the former.

I do not limit myself to the particular means shown for rendering the rim laterally recessed for receiving the marginally reinforced or enlarged casing, nor to the specific means for retaining such marginal enlargements of the casing in the recesses of the rim, nor to the specific means for restraining the tire under inflation against expansion into circular form, and any mechanic familiar with the art will readily devise other specific formations for these several parts and features which will still be within the scope of my invention as to them respectively.

I claim—

1. In a vehicle-wheel, in combination with the felly, a rim encompassing the same having laterally-opening recesses; a flexible tire-casing having its lateral edges enlarged and entered in said recesses respectively; retaining devices also entered in the recesses, said recesses being narrowed at their mouths, and the sum of the thickness of the enlarged edges of the casing and of the retaining devices in each recess being greater than the width of the mouth of the latter, said recesses being extended back from their mouths with capacity to accommodate the thickened edges, the latter being adapted to be passed back into the recesses to bring a thinner portion of the casing to the mouth, the mouth being wide enough to admit the retaining device uncompressed while accommodating said thinner portion.

2. In a vehicle-wheel, in combination with the rim having laterally-opening recesses enlarged back of their mouths, a flexible tire-casing having its edges thickened and entered in such recesses; a ring encompassing the wheel in each recess between the mouth thereof and the thickened edge of the casing therein, the thickness of such ring added to that of the thickened edge of the casing being more than the width of the mouth, said thickened edges being adapted to be withdrawn into the recesses to bring a thinner portion of the casing to the mouth the mouth being wide enough to admit the ring uncompressed while accommodating said thinner portion.

3. In a vehicle-wheel in combination with the rim having lateral recesses, a flexible tire-casing having thickened or reinforced edges entered in the recesses, and a retainer consisting of a spiral coil of wire lodged in each recess, the axis of the coil being circumferential with respect to the wheel.

4. In a vehicle-wheel in combination with the rim having laterally-opening recesses, a tire-casing having its edges thickened or reinforced and entered in said recesses; a retainer consisting of a spiral coil of wire lodged in the recesses, the coil having its axis circumferential with respect to the wheel and its diameter plus the thickness of the tire-casing back of the thickened or reinforced edge substantially equal to the width of the mouth.

5. In a vehicle-wheel in combination with the rim having laterally-opening recesses which are enlarged back of their mouths; a flexible tire-casing having its edges thickened and entered in said recesses and a retainer consisting of a spiral coil of wire lodged in each recess with its axis circumferential with respect to the wheel, the sum of the diameter of the spiral and the thickness of the thickened edge of the casing being more than the width of the mouth.

6. In a vehicle-wheel, a flexible tire-casing provided with reinforcements approximately crescent-shaped in cross-section at positions which form the sides of the tire when it is on the wheel permanently united to the casing within the same, such reinforcements having their exterior convex surface curved about a radius materially less than that of a circle to which the casing inflated the maximum cross-area would correspond for holding the casing flat or oblong in cross-section under inflation.

7. In a vehicle-wheel in combination with a rim having laterally-opening recesses narrowed at the mouth; a flexible tire-casing having thickened edges entered in said recesses respectively, and retainers in the recesses preventing the escape of such edges through the narrowed mouth, the casing being provided with reinforcements approximately crescent-shaped in cross-section at positions which form the sides of the tire when it is on the wheel, such reinforcements being permanently united to the casing within the same for holding the latter flat or oblong in cross-section under inflation.

8. In a vehicle-wheel in combination with the rim, a flexible tire-casing engaged at its lateral edges with the rim; reinforcements permanently united to the casing at a position corresponding to the opposite sides of the tire when the latter is in operative position on the wheel, such reinforcements being conformed in cross-section to a cross-sectionally flat or oblong form of the tire.

In testimony whereof I have hereunto set my hand, in the presence of two witnesses, at Chicago, Illinois, this 22d day of October, A. D. 1904.

THOS. B. JEFFERY.

In presence of—
FRED. G. FISCHER,
M. G. ADY.